(12) United States Patent
Thom et al.

(10) Patent No.: US 10,313,376 B2
(45) Date of Patent: Jun. 4, 2019

(54) TAMPERPROOF LOGS

(71) Applicant: Microsoft Technology Licensing, LLC, Redmond, WA (US)

(72) Inventors: Stefan Thom, Snohomish, WA (US); Artem Zhurid, Bellevue, WA (US); Merzin Kapadia, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 15/266,887

(22) Filed: Sep. 15, 2016

(65) Prior Publication Data

US 2018/0077184 A1 Mar. 15, 2018

(51) Int. Cl.
*H04L 29/06* (2006.01)
(52) U.S. Cl.
CPC .......... *H04L 63/1425* (2013.01); *H04L 63/10* (2013.01); *H04L 63/126* (2013.01)
(58) Field of Classification Search
CPC .... H04L 63/1425; H04L 63/126; H04L 63/10
See application file for complete search history.

(56) References Cited

U.S. PATENT DOCUMENTS

| | | | |
|---|---|---|---|
| 9,390,154 B1* | 7/2016 | Baird, III | G06F 17/30578 |
| 2015/0356523 A1* | 12/2015 | Madden | G06Q 20/065 |
| | | | 705/76 |
| 2016/0027229 A1 | 1/2016 | Spanos et al. | |
| 2016/0188590 A1* | 6/2016 | Cole | G06F 17/3087 |
| | | | 707/747 |
| 2017/0364700 A1* | 12/2017 | Goldfarb | H04L 9/3239 |
| 2017/0366353 A1* | 12/2017 | Struttmann | G06F 21/64 |

FOREIGN PATENT DOCUMENTS

| | | |
|---|---|---|
| CN | 103927656 A | 7/2014 |
| CN | 104463001 A | 3/2015 |
| WO | 2015144971 A1 | 10/2015 |

OTHER PUBLICATIONS

"How does Bitcoin work?", Retrieved on: Aug. 9, 2016 Available at: https://bitcoin.org/en/how-it-works.
Vilim, et al., "Approximate Bitcoin Mining", In Proceedings of the 53rd Annual Design Automation Conference, Jun. 5, 2016, 6 pages.
(Continued)

*Primary Examiner* — Don G Zhao
(74) *Attorney, Agent, or Firm* — Arent Fox LLP

(57) ABSTRACT

Methods and devices for creating a secure log of security events may include receiving a historical digest representing approved historical security events associated with a trusted network of devices. The methods and devices may include receiving one or more new security events. The methods and devices may include calculating, when a period of time has expired, a hash based on at least the historical digest and the one or more new security events and determining if a value of the hash is less than a value threshold. The methods and devices may include storing a new security event digest corresponding to a respective hash having a respective value less than the value threshold, wherein the new security event digest is confirmed by one or more trusted devices in the trusted network of devices.

18 Claims, 6 Drawing Sheets

(56) References Cited

OTHER PUBLICATIONS

"So You Want to Mine Bitcoins?", In Publication of Availability Digest, Apr. 2014, pp. 1-5.

Price, Rory, "Bitcoin Mining", Retrieved on: Aug. 9, 2016 Available at: https://www.doc.ic.ac.uk/project/2015/163/g1516329/website/Proof-of-Work/proof_of_work.html.

Eyal, et al., "Majority is not Enough: Bitcoin Mining is Vulnerable", In the Journal of Computing Research Repository, Nov. 2013, 18 pages.

Bastiaan, Martijn, "Preventing the 51%-Attack: a Stochastic Analysis of Two Phase Proof of Work in Bitcoin", In Proceedings of 22nd Twente Student Conference on IT, Jan. 23, 2015, pp. 1-10.

Bartoletti, et al., "Contractvm: decentralized applications on Bitcoin", In White Paper of Contractvm, Retrieved on: Aug. 9, 2016, pp. 1-20.

Böhme, et al., "Bitcoin: Economics, Technology, and Governance", In the Journal of Economic Perspectives, vol. 29, No. 2, Mar. 1, 2015, pp. 213-238.

"How do Bitcoin Transactions Work?", Retrieved on: Aug. 9, 2016 Available at: http://www.coindesk.com/information/how-do-bitcoin-transactions-work/.

Uher, et al., "Investigating end-to-end security in the fifth generation wireless capabilities and IoT extensions", In Proceedings of SPIE Cyber Sensing, vol. 9826, May 2016, 1 pages.

Lin, et al., "IoT Privacy and Security Challenges for Smart Home Environments", In Journal of Information, vol. 7, Issue 3, Jul. 13, 2016, pp. 1-15.

Kedgley, Mark, "Cyber-security of the fridge: Assessing the Internet of Things threat", Published on: May 31, 2016 Available at: http://www.scmagazineuk.com/cyber-security-of-the-fridge-assessing-the-internet-of-things-threat/article/495675/.

\* cited by examiner

TAMPERPROOF LOGS

BACKGROUND

The present aspects relate to a computer device, and more particularly, to logging security events on a computer device.

When a computer device is operating on a network, the computer device is generally susceptible to attacks, such as by a third parties or a network. Prior to a successful attack by a third party (e.g., a hacker), the third party is generally interacting with the computer device attempting to make the attack. During the time period leading up to an attack, and while an attempted attack may be taking place on the computer device, the computer device is typically operating correctly with integrity and trust. The computer device may continue to make log entries, which may be written to a log file stored on a hard drive of the computer device for later analysis by a user of the computer device, such as an administrator. Once an attack becomes successful, the third party may become the administrator of the computer device and may remove all evidence that an attack occurred. For example, the third party may remove entries from the log files that would typically alert the real administrator that an attack occurred. Enterprise machines generally protect themselves from attacks by sending the log files across the network to a reporting infrastructure or a specific log server to ensure that when a computer device is attacked, a third party individual may not erase evidence that the attack occurred. However, in a home environment, or an unmanaged environment, if an attack occurred to one of the computer devices operating on a home network, the computer devices are typically acting alone. As such, it generally is very difficult to detect an attack by a third party on a computer device in a home environment or unmanaged environment.

Thus, there is a need in the art for improvements in monitoring of security events on computer devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect relates to a computer device. The computer device may include a memory to store data and instructions, a processor in communication with the memory, and an operating system in communication with the memory and processor. The operating system may be operable to receive a historical digest representing approved historical security events associated with a trusted network of devices, receive one or more new security events, calculate, when a period of time has expired, a hash based on at least the historical digest and the one or more new security events, determine if a value of the hash is less than a value threshold, and store a new security event digest corresponding to a respective hash having a respective value less than a value threshold, wherein the new security event digest is confirmed by one or more trusted devices in the trusted network of devices.

Another aspect relates to method for creating a secure log of security events. The method may include receiving a historical digest representing approved historical security events associated with a trusted network of devices. The method may also include receiving one or more new security events. In addition, the method may include calculating, when a period of time has expired, a hash based on at least the historical digest and the one or more new security events. The method may also include determining if a value of the hash is less than a value threshold. The method may also include storing a new security event digest corresponding to a respective hash having a respective value less than a value threshold, wherein the new security event digest is confirmed by one or more trusted devices in the trusted network of devices.

Another aspect relates to computer-readable medium storing instructions executable by a computer device. The computer-readable medium may include at least one instruction for causing the computer device to receive a historical digest representing approved historical security events associated with a trusted network of devices. The computer-readable medium may include at least one instruction for causing the computer device to receive one or more new security events. The computer-readable medium may include at least one instruction for causing the computer device to calculate, a hash based on at least the historical digest and the one or more new security events. The computer-readable medium may include at least one instruction for causing the computer device to determine if a value of the hash is less than a value threshold. The computer-readable medium may include at least one instruction for causing the computer device to store a new security event digest corresponding to a respective hash having a respective value less than a value threshold, wherein the new security event digest is confirmed by one or more trusted devices in the trusted network of devices.

Additional advantages and novel features relating to aspects of the present invention will be set forth in part in the description that follows, and in part will become more apparent to those skilled in the art upon examination of the following or upon learning by practice thereof.

DETAILED DESCRIPTION

Figure 1:
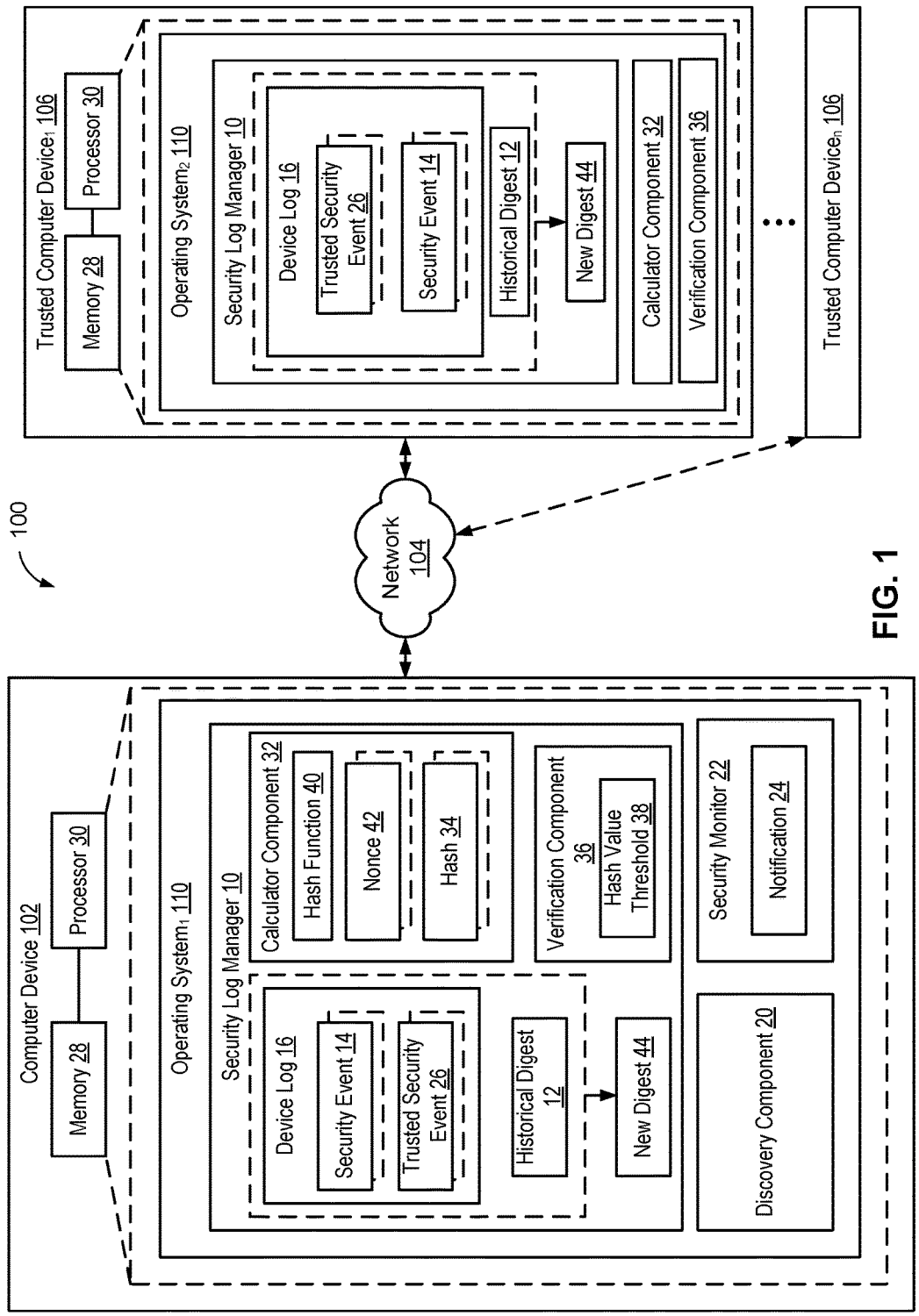
FIG. 1 is a schematic block diagram of an example device in accordance with an implementation.

The present disclosure provides a system for generating a secure log of security events for devices operating on a trusted network, e.g., a home network or an unmanaged network, where the secure log is distributed to one or more devices on the network to help detect and/or prevent attacks by third parties on the devices. As used herein, the term "security event" relates to any event on a device where another party (e.g., a hacker) would benefit if the event were erased or manipulated (e.g., to look like a less severe security event). Examples of a security event include, but are not limited to, opening of a port, event ordering, event repetition, event duplication, and event sequence recording and playback. Events may include, for example, starting or stopping services, log-on, configuration changes, file system Access Control List (ACL) changes (e.g., lowering ACLs), file deletion, and renaming.

In the disclosed system, each device in the trusted network publishes security events to one or more other devices operating on the trusted network. For instance, devices that are capable of recording security events in device logs (e.g., routers, personal computers, and devices with sufficient storage capacity) may record these published security events of other devices operating in the trusted network, as well as their own security events (which are likewise published). In an implementation, to enhance the security associated with each published security event, each device uses a device-specific security key to sign a respective security event that the respective device publishes.

Additionally, the devices that log the published security events also have a confirmed cryptographic digest that represents past security events published by devices on the trusted network. For example, the confirmed cryptographic digest may be a historical digest that is a digest agreed upon by the devices on the trusted network as being an accurate representation of the past security events, and the confirmed digest may be a hash based on a prior historical digest. The digest may be a result of inputting cryptographic parameters into a hash function.

Further, at known time intervals, one or more devices in the trusted network attempt to hash the recently collected (e.g., since the start of the interval) published security events, the confirmed digest, and a nonce value, to obtain a value that is less than a hash value threshold. In this case, the hash value threshold corresponds to a defined difficulty to find a hash that is below the threshold. Once a device obtains a solution, the device publishes the solution (e.g., publishes the nonce used in the hash function to obtain the value below the hash value threshold) for confirmation by one or more other devices in the trusted network. Once one or more other devices in the trusted network confirm the solution, then the hash (also referred to as a new, confirmed digest) corresponding to the published nonce is stored by the devices in the trusted network and associated with the security events published during the respective interval. As such, each new hash or digest builds upon the prior digest associated with previously stored security events. In the meantime, a new interval has started and the process proceeds in the same manner (e.g., publishing security events, storing the published security events for the interval, etc.). As such, a plurality of devices in the trusted network may maintain confirmed records of historical security records published by the devices on the trusted network.

Thus, the disclosed system creates distributed logs of security events (that may be signed and cannot be tampered with) and a meshed list of logs (e.g., new hashes or digests based on prior hashes or digests). Since this process moves on at intervals to create new cryptographic digests, an attacker may be forced to calculate a lot of digests, while the logging continues. This is a costly and compute intensive problem. As such, the disclosed distributed security event log storage system resists and makes more difficult attacks on devices operating on a home network, or an unmanaged network environment, as any attempted alteration of the security event log history may be easily identified based on a device trying to pass off a digest that is not cryptographically valid based on the known, valid digests.

In other words, by having copies of cryptographic digests of security events stored across a plurality of devices in a trusted network, the cost of erasing log entries by a third party after an attack is exponentially increased. Moreover, even if data for an entire device is lost, other devices have replicated copies of the lost data. Thus, by implementing the described system, devices in a home network, or unmanaged network, which typically have limited resources, enhances the security of the devices in the trusted network.

Additionally, in an implementation, the disclosed system may build the trusted network of devices based on a reputation of respective devices. The reputation of the devices may be based upon device ownership (e.g., devices owned by the same user may be determined to be trustworthy) and/or on device performance over a period of time, e.g., performance in publishing confirmed hashes.

Referring now to FIG. 1, an example system 100 for distributed logging of security events includes a computer device 102 in communication over a wired and/or wireless network 104 with one or more other trusted computer devices 106, thereby forming a trusted network. Trusted computer devices 106 may include any device that computer device 102 may communicate with over network 104 that computer device 102 has been instructed or has verified as trustworthy. Trusted computer devices 106 may operate on the same network as computer device 102 or may operate on a different network than computer device 102. Trusted computer devices 106 may include, but are not limited to, other devices that an owner of computer device 102 has identified as being trustworthy, devices that have proved their trustworthiness based on performance in maintaining and validating security event logs, devices associated with trusted user as identified by a user of computer device 102, or any devices that may be deemed trustworthy in any other manner. Examples of types of trusted computer devices 106 may include, but are not limited to, laptop, desktop, or tablet computers, gaming devices, home management systems or controllers, multimedia devices, washer/dryers, thermostats, ovens, televisions, refrigerators, dish washers, microwaves, alarms, routers, coffee makers, cameras, cellular telephones, speakers, music devices, and/or any other type of Internet of Things (IoT) device. Computer device 102 and/or each trusted computer device 106 in accordance with the present disclosure may include an operating system 110 executed by processor 30 and/or memory 28 of computer device 102. Memory 28 may be configured for storing data and/or computer-executable instructions defining and/or associated with operating system 110, and processor 30 may execute operating system 110. An example of memory 28 can include, but is not limited to, a type of memory usable by a computer, such as random access memory (RAM), read only memory (ROM), tapes, magnetic discs, optical discs, volatile memory, non-volatile memory, and any combination thereof. An example of processor 30 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network 104. Computer device 102 may be, for example, a computer device such as a desktop or laptop or tablet computer, a cellular telephone, a gaming device, a music device, a television, a navigation system, a camera, a personal digital assistant (PDA), or a handheld device, or any other computer device having wired and/or wireless connection capability with one or more other devices.

Additionally, the computer device 102, and at least one or more of the trusted computer devices 106, includes a security log manager 10 configured to manage tracking of security events that occur on the computer device 102 (e.g., security event 14), and on other respective trusted computer devices 106 (e.g., trusted security event 26) in the trusted network. For instance, each security log manager 10 includes one or more device logs 16 having one or more security events associated with a given time interval. As such, computer device 102 and one or more other trusted computer devices 106 having logs for tracking security events within the trusted network define the system 100 for distributed logging of security events. As described herein, security events may include, but are not limited to, opening a port, creating a buffer, event ordering, event repetition, event duplication, event sequence recording and playback, or any other event that a third party may have a benefit if the event has been erased or manipulated. Events may include, but are not limited to, starting or stopping services, log-on, configuration changes, file system Access Control List (ACL) changes (e.g., lowering ACLs), file deletion, and renaming. By distributing logs of the security event across a plurality of devices in the trusted network, the security of the trusted network may be improved as the distributed security logs discourage a hacker by making it more difficult to cover up their tracks, as security events shared across multiple devices would need to be erased and cryptographically protected logs would need to be manipulated, which would be a difficult task.

With respect to local security events, each security log manager 10 may record in a respective device log 16 one or more security events occurring on a respective local device, e.g., security events 14 on computer device 102, are collected in respective device log 16 and trusted security events 26 on trusted computer device 106 are collected in respective device log 16. As such, a respective device log 16 on computer device 102 may include a record of security events 14 occurring on computer device 102, and each respective device log 16 on each respective trusted computer device 106 may include a record of trusted security events 26 occurring on each respective trusted computer device 106.

In addition, each security log manager 10 may transmit the local security events to the other computer devices on the trusted network, which may be referred to as publishing the security events. For example, security log manager 10 on computer device 102 may transmit security events 14 to one or more trusted computer devices 106 in communication with computer device 102 over network 104. In this case, one or more trusted computer devices 106 that are capable of recording security events 14 in a respective device log 16, including devices having sufficient memory such as but not limited to routers, personal computers, and any other devices with sufficient storage capacity) may record the published security events 14. Similarly, for example, security log manager 10 on any other trusted computer device 106 in the trusted network may transmit trusted security events 26 to other ones of the one or more trusted computer devices 106 and to computer device 102. As such, each security log manager 10 may transmit and/or may receive security events (security events 14 and/or trusted security events 26), which are thus logged to collect all security events occurring on devices within the trusted network.

Each security log manager 10 operates in this manner, e.g., publishing local security events and receiving and storing security events from other devices in the trusted network, for a certain time interval known to all security log managers 10. The beginning and/or end of each time interval may be tracked by a timer and/or clock that is synchronized between the devices on the trusted network, and/or may be signaled to all devices in the trusted network. The time interval may be selected so that computing a hash 34 based on the security events collected in device log 16 for the time interval is manageable, while allowing enough security events to be captured to maintain a secure log.

Additionally, each security log manager 10 stores a record representative of prior, confirmed security events that have occurred in the trusted network in one or more previous time intervals. In an example, such record may be in the form of a cryptographic historical digest 12, e.g., a hash, based on previously logged security events published by devices in the trusted network. Historical digest 12 has a value that is confirmed or agreed upon, via consensus among two or more devices in the trusted network.

At the end of each time interval, security log manager 10 starts a new device log for newly published security events for the next time interval, and triggers a calculator component 32 to validate the device log 16 for the just-ended time interval. Calculator component 32 obtains or has access to device log 16 for the time interval and historical digest 12, and based on these inputs attempts to calculate a hash 34 having a value less than a hash threshold value 38. For example, hash value threshold 38 is known to all security log managers 10, and corresponds to a defined difficulty to find hash 34 that is below hash value threshold 38. More specifically, calculator component 32 includes a hash function 40, which is known to all security log managers 10, used to calculate hash 34. For example, hash function 40 is a one way hash function, such as but not limited to, a secure hash algorithm-n (SHA-n, where n can be an integer that represents one of a family of SHA algorithms, e.g., SHA-1, SHA-256, etc.), and a Cipher-based Message Authentication Code (CMAC) using a 128-bit Advanced Encryption Standard (AES) (AES-CMA) and a key generation with SP800-108. Further, in order to provide variability and difficulty, calculator component 32 is configured to include a nonce 42 in addition to historical digest 12 and device log 16 of published security events for the time interval, as an input to hash function 40. For example, nonce 42 is a set of values that may be varied, in length and/or in the respective values included in the set so that nonce 42 never repeats.

As such, each calculator component 32 (on computer device 102 and one or more trusted computer devices 106) generates a set of values for nonce 42, and inputs nonce 42, historical digest 12, and device log 16 of published security events for the time interval into hash function 40 to generate hash 34. Calculator component 32 then communicates the value of hash 34 to a verification component 36, which determines whether hash 34 has a value less than hash value threshold 38. If not, then calculator component 32 generates a new nonce 42 and repeats the process until verification component 36 notifies calculator component 32 that hash 34 satisfies hash value threshold 38, or that another device on trusted network has published nonce that corresponds to a hash having a value that satisfies hash value threshold 38. If hash 34 generated by calculator component 32 does satisfy hash value threshold 38, and if a published nonce that corresponds to hash 34 having a value that satisfies hash value threshold 38 has not been received from another device in trusted network, then calculator component 32 and/or verification component 36 initiate the publishing of nonce 42 to the other devices in trusted network (or at least to devices having security log managers 10). Upon receiving verification from one or more other devices in trusted network (e.g., by inputting the published nonce into the hash function with the other known inputs), and/or upon verifying a nonce received from another device, the devices in the trusted network agree upon the value of hash 34, which is then stored by security log manager 10 as a new digest 44 associated with the security events logged for the respective time interval. Thus, a plurality of devices in trusted network may have logs of historical security events published by devices in the network, and such distributed logs are built upon one another and cryptographically protected, thereby vastly increasing the difficulty for any hacker attempting to alter a security event on a device in the trusted network.

With regard to establishing and/or expanding trusted network, computer device 102 (and/or one or more of trusted computer devices 106) may include a discovery component 20 to identify one or more trusted computer devices 106 (or, computer device 102 and/or one or more other trusted computer devices 106). Discovery component 20 may identify one or more trusted computer devices 106 in communication with computer device 102 and may create a trusted peer-to-peer (P2P) network of trusted computer devices 106 based on the reputations of trusted computer devices 106. In an aspect, the number of trusted computer devices 106 included in the trusted network may be limited. By limiting the number of trusted computer devices 106 in the trusted network, the number of trusted security events 26 received from trusted computer devices 106 may be minimized or held to a number that corresponds to a computational capability (e.g., for finding a value of hash 34) of devices in the trusted network. For example, but not limited hereto, discovery component 20 may limit the number of trusted computer devices 106 that may be added to the trusted network to twenty devices.

In an aspect, the reputation of computer device 102 and trusted computer devices 106 may be based upon ownership. For example, trusted computer devices 106 that are owned by the same individual as computer device 102 and/or are operated on the same home network may include a trustworthy reputation, such as a positive reputation and/or or a high value. The reputation of computer device 102 and trusted computer devices 106 may also be based upon device performance in generating or validating hashes 34 that are confirmed. Computer device 102 and/or one or more trusted computer devices 106 may review the performance of other devices, e.g., trusted computer devices 106 or computer device 102, over a period of time. The reputation of computer device 102 and trusted computer device 106 may increase as the period of time increases and the performance of computer device 102 and/or trusted computer device 106 continues to operate correctly. However, the reputation of computer device 102 and/or trusted computer device 106 may become negative and/or decrease in value when computer device 102 and/or trusted computer device 106 provide incorrect information a respective device log 16, historical digest 12, and/or new digest 44. As such, the reputation of computer device 102 and/or trusted computer devices 106 may change over time based on device performance.

Additionally, in some implementations, computer device 102 (and/or one or more trusted computer devices 106) may include a security monitor 22 to verify the integrity of computer device 102 and/or other trusted computer devices 106 operating in the trusted network. Security monitor 22 may be configured to occasionally review and compare device logs 16, historical digests 12, and/or new digests 44 among different devices on trusted network to verify the information in a respective device log 16, historical digest 12, and/or new digest 44 is correct. When the review of a respective device log 16, historical digest 12, and/or new digest 44 identifies abnormalities in the information, e.g., information in the respective device log 16, historical digest 12, and/or new digest 44 is incorrect and/or missing, security monitor 22 may identify one or more devices (e.g., computer device 102 and/or one or more trusted computer devices 106) that may have provided incorrect information for the respective device log 16, historical digest 12, and/or new digest 44. In addition, security monitor 22 may generate a notification 24 that indicates a security issue may be present in the trusted network. Notification 24 may include, for example, a type of error detected and a device identifier for the error. Notification 24 may be transmitted to a user of one or more devices in trusted network (e.g., an owner of computer device 102 and/or one or more trusted computer devices 106), notifying the one or more users of the potential error. Upon an error being detected by security monitor 22, one or more devices (e.g., computer device 102 and/or one or more trusted computer devices 106) identified may be removed from the trusted network until the reputation of the device may be established as trustworthy again.

It should be noted that while FIG. 1 only illustrates discovery component 20 and security monitor 22 on a single device in trusted network, e.g., computer device 102, these components may be included on a different device or on multiple other devices (e.g., on one or more of trusted computer devices 106).

In summary, by spreading logs of security events, e.g., device logs 16, and historical digest 12 and new digest 44 over multiple devices in the trusted network, the ability of a third party (e.g., a hacker) to take over devices in the trusted becomes significantly more difficult. In addition, because each new digest 44 is a function of the previous, historical digest 12, each respective new digest 44 is a moving leger that builds on the previous information provided. As such, when a third party attempts to attack a device in the trusted network, it becomes exponentially more difficult for the third party to remove evidence of the attack because new digest 44 builds on the previous information, which has been published to all devices in the trusted network. Instead of a third party attacking one device and being able to remove evidence of the attack, the third party may be forced to attack numerous devices in the trusted network to remove evidence of the attack, which increases the difficulty of the attack. Moreover, even if a third party was successful in erasing or manipulating the log of one device, other devices in the trusted network will have copies of the erased or manipulated security events and may be able to verify that the log was erased or manipulated. This significantly increases the difficulty of erasing or manipulating evidence of an attack in a home network or an unmanaged environment. Thus, devices operating on a home network, or an unmanaged environment, may protect themselves from potential attacks based on implementing one or more features of the present disclosure.

Figure 2:
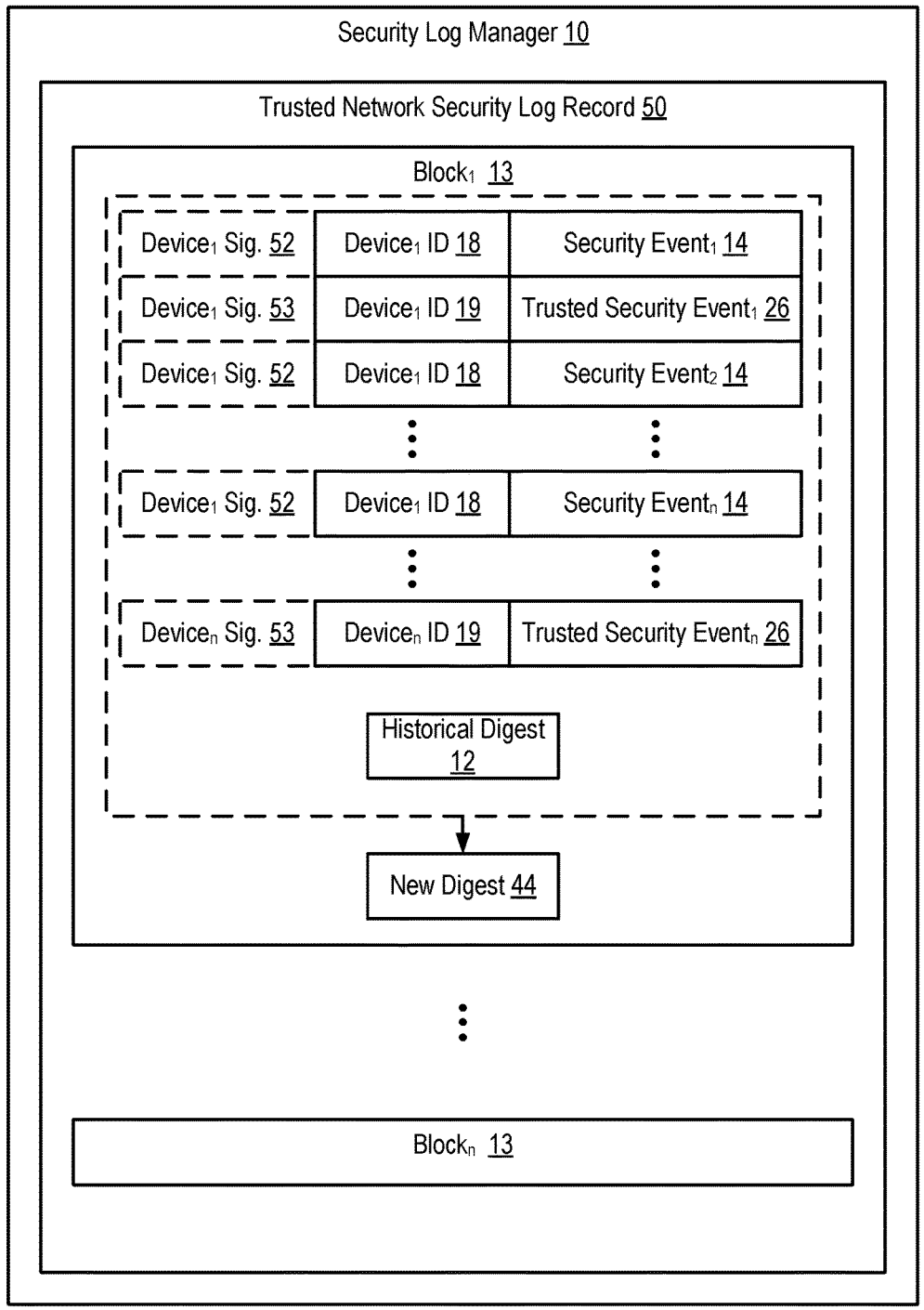
FIG. 2 is a schematic block diagram of an example security log manager component including a trusted network security log record in accordance with an implementation.

Referring now to FIG. 2, in an example, at least one security log manager 10 on one device in trusted network, and preferably a plurality and/or all security log managers 10, include a trusted network security log record 50 of all security events published over time in the trusted network. In some implementations, some security log managers 10 may only include respective digests for each respective time interval, where the digests correspond to the full records of each individual security event published as stored in trusted network security log record 50.

In one implementation, for example, trusted network security log record 50 may include respective blocks 13 (e.g., blocks 1 to n, where n is a positive value) that include a fixed sized representation of the published security events 14 and trusted security events 26 that have occurred on computer device 102 and/or trusted computer devices 106 for each respective time interval. Additionally, each block 13 may include historical digest 12, e.g., a mathematical summary (e.g., a hash) of the previous block. Further, the list of security events and historical digest 12 of each block is additionally associated with new digest 44. As such, blocks 13 may build upon the previously stored security events in historical digest 12.

The record of security events in trusted network security log record 50 may also identify the computer devices 102 and trusted computer devices 106 that published the respective security events 14 and trusted security events 26, for example, by a device identifier ID 18 associated with computer device 102 and device ID 19 associated with each respective trusted computer device 106. Further, for enhanced security, each published security event may further include a respective digital signature, such as digital signature 52 of computer device 102 and digital signature 53 of trusted computer device 106. While any known asymmetric (e.g., public/private key pair) encryption algorithm can be used to generate the respective digital signature, some implementations may use algorithms that result in less data storage, such as elliptic curve cryptography (ECC) algorithms. As such, in some implementations, each device on trusted network attaches its respective device ID and/or its respective digital signature to each published security event.

For example, security monitor 22 may utilize trusted network security log record 50 as a basis for comparison when looking for abnormalities in a given device log 16, historical digest, or new digest 44. As such, any given set of security information can be tested to see if it correlates back to the information of trusted network security log record 50.

It should be noted that, in some cases, when two devices in trusted network identify two different hashes 34 that are under the hash value threshold 38, trusted network security log record 50 may be split and the devices within the trusted network may follow different trusted network security log records 50. As such, multiple trusted network security log records 50 may be stored within trusted network.

Figure 3A:
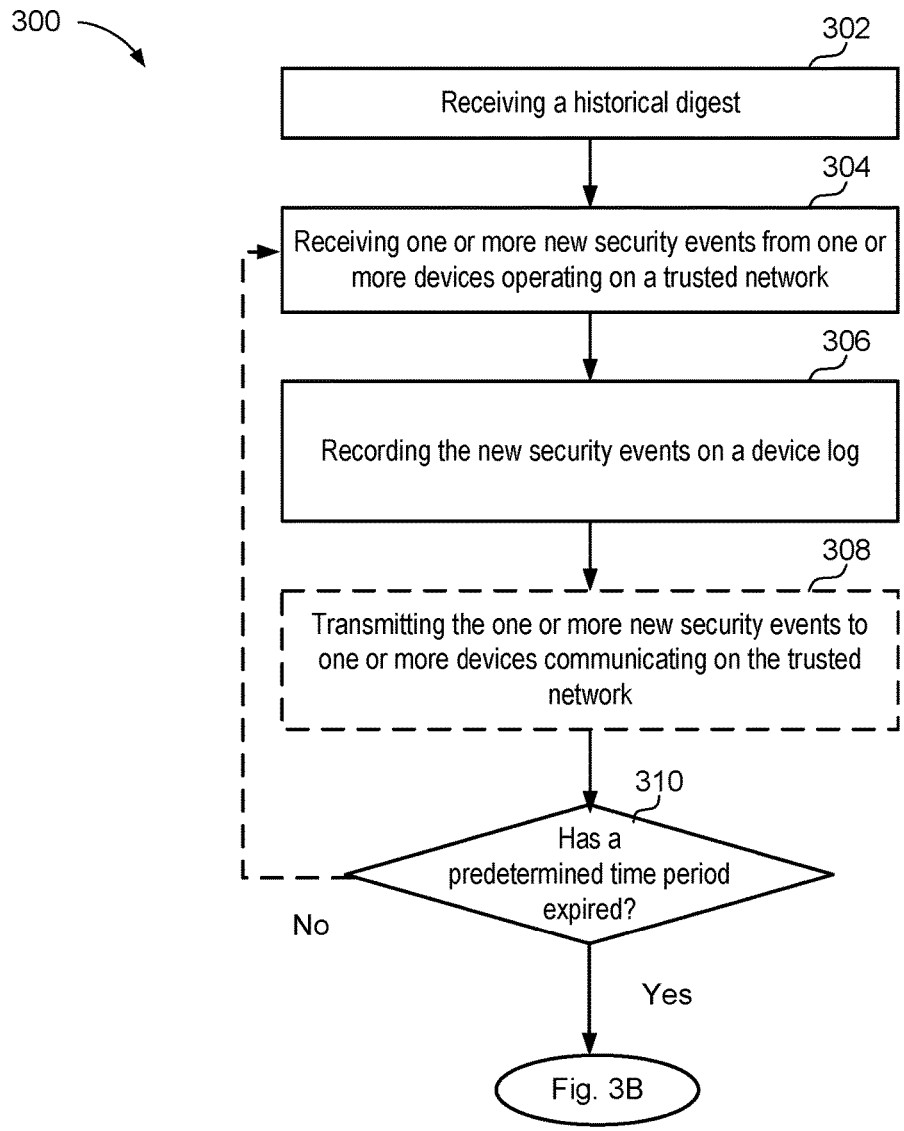
FIGS. 3A and 3B are a flow chart of a method for creating a secure log of security events in accordance with an implementation.
Figure 3B:
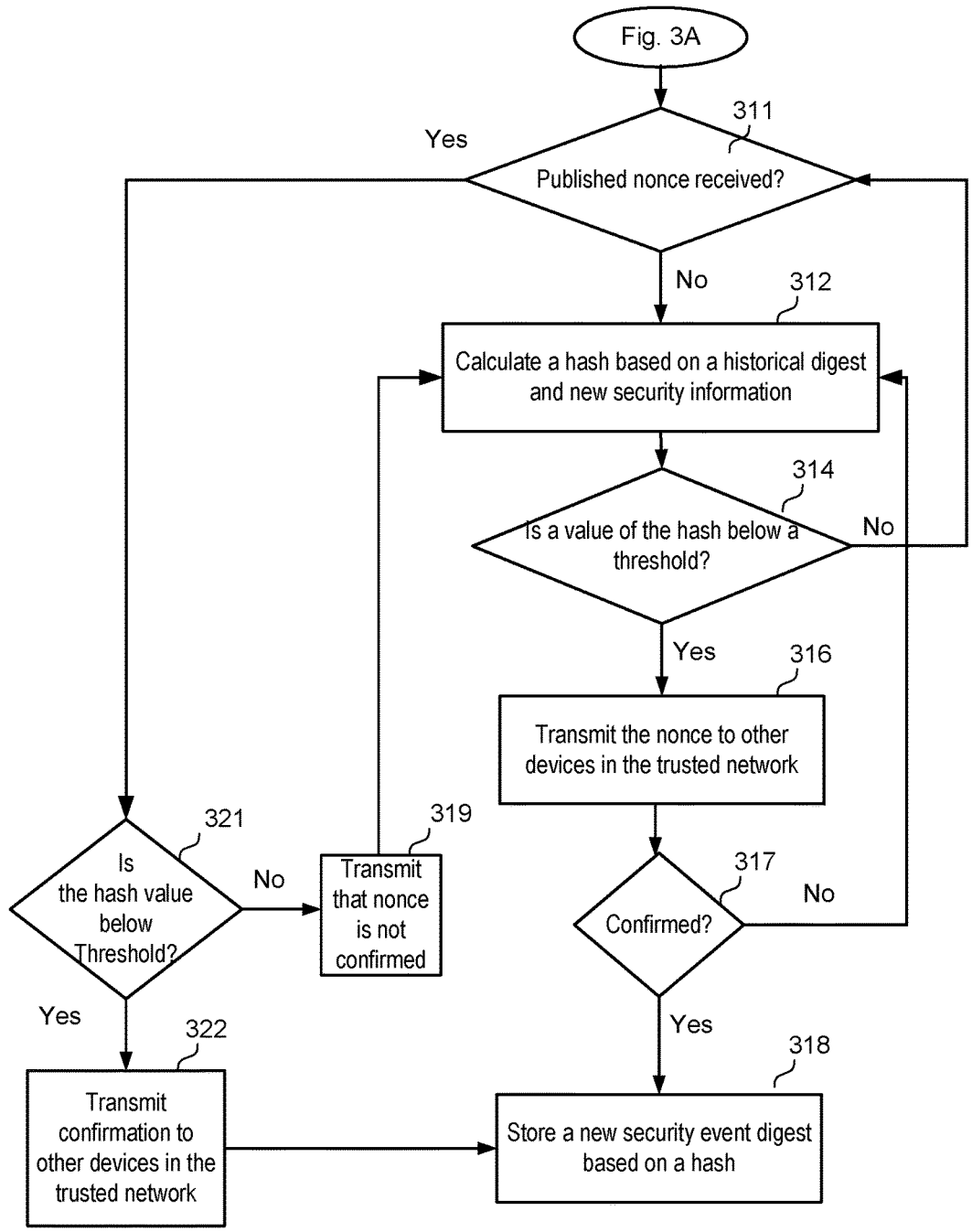

Referring now to FIGS. 3A and 3B, an example method 300 for creating a secure log of security events that may be executed by operating system 110 (FIG. 1) on computer device 102 (FIG. 1), for example, in response to new security events 14 (FIG. 1) occurring on computer device 102 or trusted new security events 26 (FIG. 1) received from one or more trusted computer devices 106 (FIG. 1) operating on a trusted network.

At 302, method 300 may include receiving a historical digest. For example, security log manager 10 (FIG. 1) executed by operating system 110 may receive historical digest 12 (FIG. 1). Historical digest 12 may be an accepted and/or trusted digest hashed from the previously stored security events that have occurred on computer device 102 and/or trusted computer devices 106 within a given time interval, and hashed based on a prior historical digest.

At 304, method 300 may include receiving one or more new security events from one or more devices operating on a trusted network. For example, security log manager 10 may receive one or more security events 14 from computer device 102. In addition, security log manager 10 may receive one or more trusted security events 26 from one or more trusted computer devices 106. Security log manager 10 may also receive a combination of security events 14 from computer device 102 and trusted security events 26 from one or more trusted computer devices 106. Trusted security events 26 may include a device ID and/or a digital signature, e.g., signed with a device-specific private key, such as an ECC key, by trusted computer devices 106 so that computer device 102 may identify which trusted computer device 106 transmitted trusted security event 26. As such, the digital signature may be used for integrity protection of the transmissions. Security events may include, for example, any event where a third party may benefit if the information was erased or modified, including events such as, but not limited to, opening a port and creating a buffer.

Trusted computer devices 106 may include any device that computer device 102 may communicate with over network 104 that computer device 102 has been instructed or has verified as trustworthy. Trusted computer devices 106 may operate on the same network as computer device 102 or may operate on a different network than computer device 102. Trusted computer devices 106 may include, but are not limited to, other devices that an owner of computer device 102 has identified as being trustworthy, devices that have proved their trustworthiness based on performance in maintaining and validating security event logs, devices associated with trusted user as identified by a user of computer device 102, or any devices that may be deemed trustworthy in any other manner. Examples of types of trusted computer devices 106 may include, but are not limited to, laptop, desktop, or tablet computers, gaming devices, home management systems or controllers, multimedia devices, washer/dryers, thermostats, ovens, televisions, refrigerators, dish washers, microwaves, alarms, routers, coffee makers, cameras, cellular telephones, speakers, music devices, and/or any other type of Internet of Things (IoT) device. In an aspect, the number of devices that are permitted in the trusted network may be limited to twenty devices.

At 306, method 300 may include recording the new security events on a device log. In an aspect, security log manager 10 may record the received new security events 14 and/or trusted security events 26 in device log 16 (FIG. 1), which may be stored in memory 28.

In addition, at 308, method 300 may optionally include transmitting the one or more new security events to other devices communicating on a trusted network. For example, when the security event is a local security event, such as security event 14 on computer device 102, security log manager 10 may transmit the received new security events 14 to one or more trusted computer devices 106 (FIG. 1) in communication with computer device 102. In an aspect, the trusted computer devices 106 in the trusted network are devices that are capable of recording logs (e.g., routers, computers, or other devices with sufficient storage capacity). As such, in this example, one or more trusted computer devices 106 may record the transmitted new security events 14 from computer device 102 on their respective device log 16 (FIG. 1). Further, in some examples, computer device 102 may include a device ID and/or a digital signature, e.g., signed with a device-specific private key, such as an ECC key, by computer device 102 so that any other devices in trusted network, e.g., one or more trusted computer devices 106, may confirm that computer device 102 transmitted security event 14.

At 310, method 300 may include determining whether a predetermined time period has expired. The predetermined time period may be a certain time interval known to all security log managers 10. The beginning and/or end of each time interval may be tracked by a timer and/or clock that is synchronized between the devices on the trusted network, and/or may be signaled to all devices in the trusted network. The time interval may be selected so that computing a hash 34 (FIG. 1) based on the security events collected in device log 16 (FIG. 1) for the time interval is manageable, while allowing enough security events to be captured to maintain a secure log. If the time period has not expired, the method may return to 304 to receive additional security events.

When the time period has expired, additional processing may occur to determine a cryptographically secure version of the security events published during the interval. Before beginning this processing, e.g., to find a hash of the security events, a prior digest, and a nonce that has a value less than a hash value threshold, at 311, method 300 may include determining whether a published nonce is received. For example, security log manager 10 and/or verification component 36 may have received, from another device on the trusted network, a nonce 42 that corresponds to a hash having a value that is below a hash value threshold.

When a published nonce has been received, at 321, method 300, may include determining whether the hash value is below a threshold. For example, verification component 36 may confirm that nonce 42 produces a hash less than the threshold by inputting nonce 42, the new security events 14 and/or 26, and historical digest 12 into hash function 40 to confirm that nonce 42 produces a value less than the threshold.

At 322, method 300 may include transmitting the confirmation to other devices in the trusted network when the hash value has been verified as being below the threshold. For example, security log manager 10 may publish the confirmation of nonce 42 to other devices in the trusted network.

When the hash value has not been confirmed as being below the threshold, at 319, method 300 may include transmitting a non-confirmation message to the device that proposed the nonce and to other devices in the trusted network, and method 300 may proceed to 312. For example, security log manager 10 may publish a non-confirmation message to other devices in the trusted network when nonce 42 produces a hash above the threshold value.

When a published nonce has not been received, at 312, method 300 may include attempting to calculate a hash based on the historical digest and the new security events. For example, calculator component 32 (FIG. 1) may calculate a set of values for nonce 42, and may input nonce 42, historical digest 12, and device log 16 of published security events for the time interval into hash function 40 to generate hash 34.

At 314, method 300 may include determining whether the hash value is below a threshold. For example, calculator component 32 may communicate the value of hash 34 to verification component 36, which determines whether hash 34 has a value less than hash value threshold 38. If hash 34 has a value equal to, or above, threshold 38, method 300 may proceed to 311 to determine whether another device on trusted network has published a nonce that corresponds to a hash having a value that satisfies hash value threshold 38.

If the hash value does satisfy the hash value threshold, at 316, method 300 may include transmitting the nonce to other devices in the trusted network. For example, calculator component 32 and/or verification component 36 may initiate the publishing of nonce 42 to the other devices in trusted network (or at least to devices having security log managers 10).

At 317, method 300 may include determining whether one or more other devices in the trusted network have confirmed that the hash value is below a threshold. For example, security log manager 10 may receive a verification from one or more other devices in trusted network (e.g., by inputting the published nonce into the hash function with the other known inputs) that hash value 34 is below a threshold. When the hash value is not confirmed by another device in the trusted network, method 300 may proceed to 312 and the process may repeat until a hash value is accepted and/or verified by other devices in the trusted network.

When other devices in the trusted network agree upon the value of hash as satisfying the threshold, at 318, method 300 may include storing a new security event digest based on the hash. The hash may include, for example, the hash value 34 calculated by calculator component 32 or a different hash based on a published nonce 42 received from trusted computer device 106. For example, security log manager 10 may store a new digest 44 associated with the security events 14 and/or 26 logged for the respective time interval. Thus, a plurality of devices in trusted network may have logs of historical security events published by devices in the network, and such distributed logs are built upon one another and cryptographically protected, thereby vastly increasing the difficulty for any hacker attempting to alter a security event on a device in the trusted network.

Figure 4:
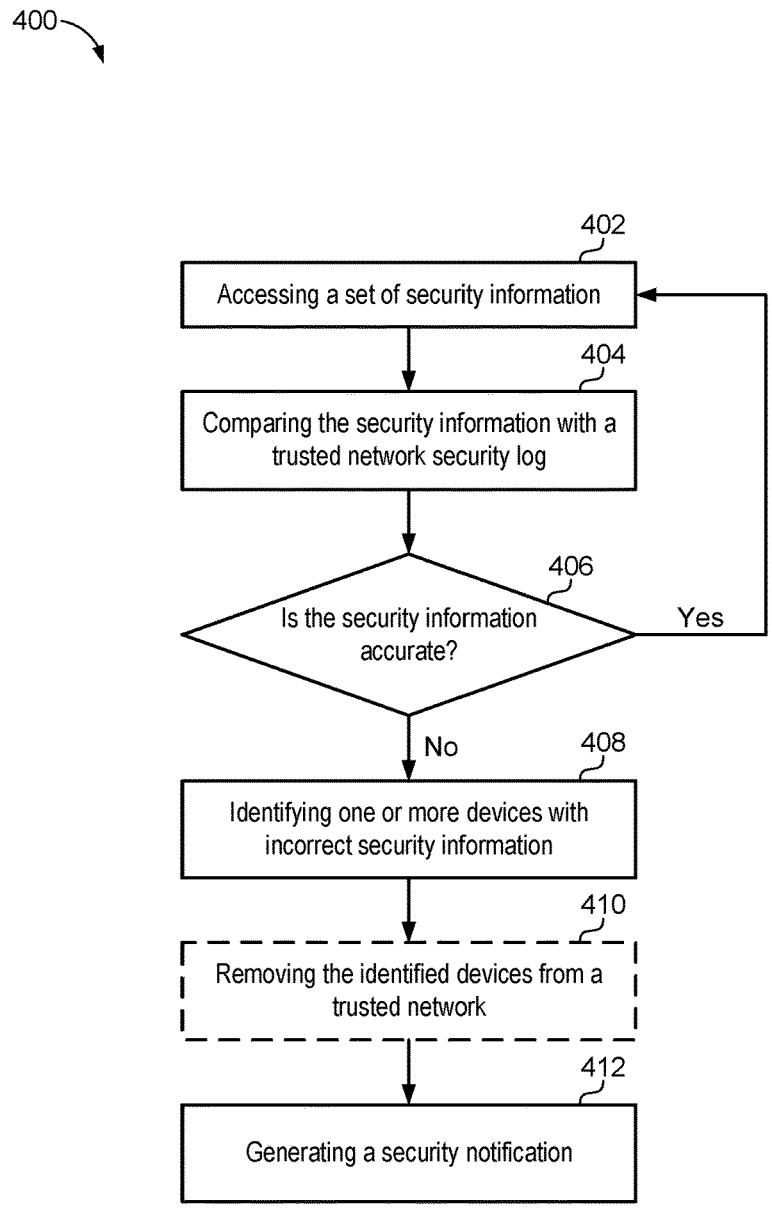
FIG. 4 is a flow chart of a method for performing a security review in accordance with an implementation.

Referring now to FIG. 4, is an example method 400 for performing a security review that may be executed by operating system 110 (FIG. 1) on computer device 102 (FIG. 1), for example, to verify the integrity of security information. At 402, method 400 may include accessing a set of security information. A set of security information may include, but is not limited to, device log 16 (FIG. 1), historical digest 12 (FIG. 1), and/or new digest 44 (FIG. 1). For example, security monitor 22 (FIG. 1) may occasionally review the information in device log 16, historical digest 12, and/or new digest 44 to verify whether the information is correct.

At 404, method 400 may also include comparing the security information with a trusted network security log. For example, security monitor 22 may compare the information in device log 16, historical digest 12, and/or new digest 44 with information stored in trusted network security log record 50 (FIG. 2). As such, security monitor 22 may be able to compare the security information among different devices in the trusted network.

At 406, method 400 may include verifying whether the security information is accurate. For example, when security monitor 22 compares the information in device log 16, historical digest 12, and/or new digest 44 with information stored in trusted network security log record 50, security monitor 22 may identify abnormalities in the security information. Abnormalities in the security information may include, but are not limited to, incorrect data or missing data. When the review of the security information indicates that the data is correct (e.g., no abnormalities are detected in the data), method 400 may proceed to 402 and the process may repeat.

When the review of the security information indicates that the data is incorrect (e.g., one or more abnormalities are detected in the data), at 408, method 400 may include identifying one or more devices with incorrect security information. For example, when security monitor 22 identifies abnormalities in the information, e.g., information in the respective device log 16, historical digest 12, and/or new digest 44 is incorrect and/or missing, security monitor 22 may identify one or more devices (e.g., computer device 102 and/or one or more trusted computer devices 106) that may have provided incorrect information for the respective device log 16, historical digest 12, and/or new digest 44.

Optionally, at 410, method 400 may include removing the identified devices from a trusted network. Upon an error being detected by security monitor 22, one or more devices (e.g., computer device 102 and/or one or more trusted computer devices 106) identified may be removed from the trusted network until the reputation of the device may be established as trustworthy again.

At 412, method 400 may also include generating a security notification. For example, security monitor 22 may generate a notification 24 that indicates a security issue may be present in the trusted network. Notification 24 may include, for example, a type of error detected and a device identifier for the error. Notification 24 may be transmitted to a user of one or more devices in trusted network (e.g., an owner of computer device 102 and/or one or more trusted computer devices 106), notifying the one or more users of the potential error.

Figure 5:
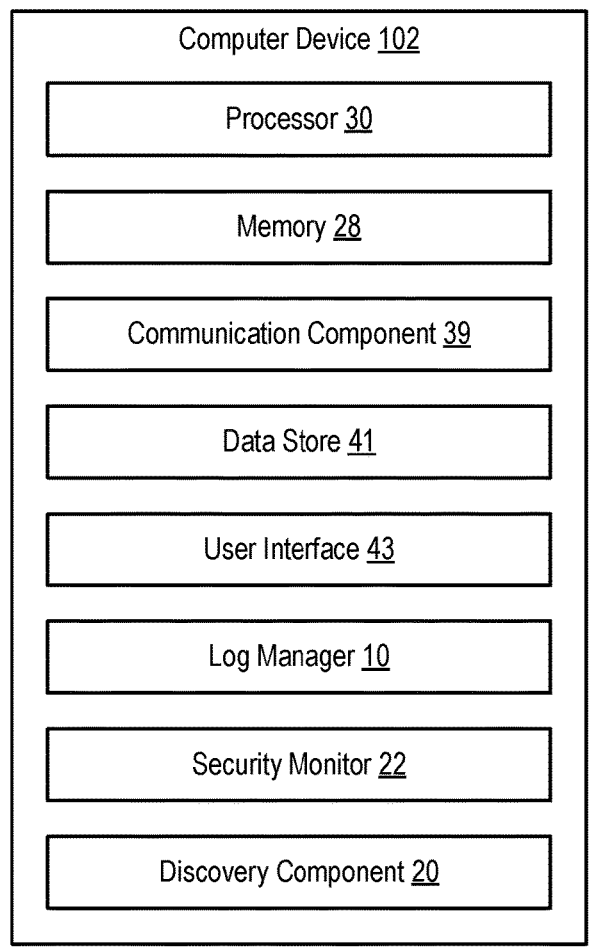
FIG. 5 is a schematic block diagram of an example device in accordance with an implementation.

Referring now to FIG. 5, illustrated is an example computer device 102 in accordance with an aspect, including additional component details as compared to FIG. 1. In one aspect, computer device 102 may include processor 30 for carrying out processing functions associated with one or more of components and functions described herein. Processor 30 can include a single or multiple set of processors or multi-core processors. Moreover, processor 30 can be implemented as an integrated processing system and/or a distributed processing system.

Computer device 102 may further include memory 28, such as for storing local versions of applications being executed by processor 30. Memory 28 can include a type of memory usable by a computer, such as random access memory (RAM), read only memory (ROM), tapes, magnetic discs, optical discs, volatile memory, non-volatile memory, and any combination thereof. Additionally, processor 30 and memory 28 may include and execute operating system 110 (FIG. 1).

Further, computer device 102 may include a communications component 39 that provides for establishing and maintaining communications with one or more parties utilizing hardware, software, and services as described herein. Communications component 39 may carry communications between components on computer device 102, as well as between computer device 102 and external devices, such as devices located across a communications network and/or devices serially or locally connected to computer device 102. For example, communications component 39 may include one or more buses, and may further include transmit chain components and receive chain components associated with a transmitter and receiver, respectively, operable for interfacing with external devices.

Additionally, computer device 102 may include a data store 41, which can be any suitable combination of hardware and/or software, that provides for mass storage of information, databases, and programs employed in connection with aspects described herein. For example, data store 41 may be a data repository for security log manager 10 (FIG. 1), security monitor 22 (FIG. 1), discovery component 20 (FIG. 1), device log 16 (FIG. 1), and historical digest 12 (FIG. 1).

Computer device 102 may also include a user interface component 43 operable to receive inputs from a user of computer device 102 and further operable to generate outputs for presentation to the user. User interface component 43 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 43 may include one or more output devices, including but not limited to a display, a speaker, a haptic feedback mechanism, a printer, any other mechanism capable of presenting an output to a user, or any combination thereof.

Computer device 102 may additionally include security log manager 10 (FIG. 1) operable for managing tracking of security events that occur on computer devices 102 and on other respective trusted computer devices 106 in a trusted network. In addition, computer device 102 may include discovery component 20 (FIG. 1) operable to search devices in communication with computer device 102 and identify trustworthy devices to include in a trusted network. Computer device 102 may also include security monitor 22 (FIG. 1) operable to verify received data and identify any abnormalities in the received data. In an aspect, user interface component 43 may transmit and/or receive messages corresponding to the operation of security log manager 10, discovery component 20 and/or security monitor 22. In addition, processor 30 executes security log manager 10, discovery component 20 and/or security monitor 22, and memory 28 or data store 41 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device (e.g., computer device 102 and/or trusted computer device 106), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computer device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A computer device, comprising:
a memory to store data and instructions;
a processor in communication with the memory; and
an operating system in communication with the memory and processor, wherein the operating system is configured to:
receive a historical digest representing approved historical security events associated with a trusted network of devices communicating with the computer device, wherein the trusted network of devices is created by adding one or more trusted computer devices to the trusted network of devices when the one or more trusted computer devices have a trustworthy reputation;
receive one or more new security events;
calculate a hash based on at least the historical digest and the one or more new security events;
determine if a value of the hash is less than a value threshold; and
store a new security event digest corresponding to a respective hash having a respective value less than the value threshold, wherein the new security event digest is confirmed by one or more trusted devices in the trusted network of devices.

2. The computer device of claim 1, wherein the one or more new security events are published by the computer device, or at least one trusted device operating on the trusted network of devices, or a combination of the computer device and the at least one trusted device.

3. The computer device of claim 2, wherein the one or more new security events are signed by the computer device or the at least one trusted device.

4. The computer device of claim 1, wherein the trustworthy reputation is based on device performance in maintaining and validating security event logs over a time period.

5. The computer device of claim 1, wherein the respective hash having the respective value is the hash or a different hash based on a nonce published by a trusted device on the trusted network of devices.

6. The computer device of claim 1, wherein the operating system is further configured to:
verify an accuracy of security information in one or more of the historical digest, the new digest, or a device log; and
identify one or more trusted computer devices with incorrect security information when the security information is determined to be incorrect.

7. The computer device of claim 6, wherein the operating system is further configured to prevent the identified trusted computer devices from communicating with the computer device.

8. The computer device of claim 6, wherein the operating system is further configured to send a notification when the security information is determined to be incorrect.

9. The computer device of claim 1, wherein the operating system is further configured to transmit the hash having the value less than a value threshold to one or more trusted devices in the trusted network of devices.

10. A method for creating a secure log of security events on a computer device, comprising:
   receiving, at an operating system executing on the computer device, a historical digest representing approved historical security events associated with a trusted network of devices communicating with the computer device, wherein the trusted network of devices is created by adding one or more trusted computer devices to the trusted network of devices when the one or more trusted computer devices have a trustworthy reputation;
   receiving, by the operating system, one or more new security events;
   calculating a hash based on at least the historical digest and the one or more new security events;
   determining if a value of the hash is less than a value threshold; and
   storing a new security event digest corresponding to a respective hash having a respective value less than the value threshold, wherein the new security event digest is confirmed by one or more trusted devices in the trusted network of devices.

11. The method of claim 10, wherein the one or more new security events are published by the computer device, or at least one trusted device operating on the trusted network of devices, or a combination of the computer device and the at least one trusted device.

12. The method of claim 11, wherein the one or more new security events are signed by the computer device or the at least one trusted device.

13. The method of claim 10, wherein the trustworthy reputation is based on device performance in maintaining and validating security event logs over a time period.

14. The method of claim 10, wherein the respective hash having the respective value is the hash or a different hash based on a nonce published by a trusted device on the trusted network of devices.

15. The method of claim 10, further comprising:
   verifying an accuracy of security information in one or more of the historical digest, the new digest, or a device log;
   identifying one or more trusted computer devices with incorrect security information when the security information is determined to be abnormal; and
   sending a notification when the security information is determined to be incorrect.

16. The method of claim 15, further comprising preventing the identified trusted computer devices from communicating with the computer device.

17. The method of claim 10, further comprising transmitting the hash having the value less than a value threshold to one or more trusted devices in the trusted network of devices.

18. A computer-readable medium storing instructions executable by a computer device, comprising:
   at least one instruction for causing the computer device to receive a historical digest representing approved historical security events associated with a trusted network of devices communicating with the computer device, wherein the trusted network of devices is created by adding one or more trusted computer devices to the trusted network of devices when the one or more trusted computer devices have a trustworthy reputation;
   at least one instruction for causing the computer device to receive one or more new security events;
   at least one instruction for causing the computer device to calculate a hash based on at least the historical digest and the one or more new security events;
   at least one instruction for causing the computer device to determine if a value of the hash is less than a value threshold; and
   at least one instruction for causing the computer device to store a new security event digest corresponding to a respective hash having a respective value less than the value threshold, wherein the new security event digest is confirmed by one or more trusted devices in the trusted network of devices.

* * * * *